Figure 1A:
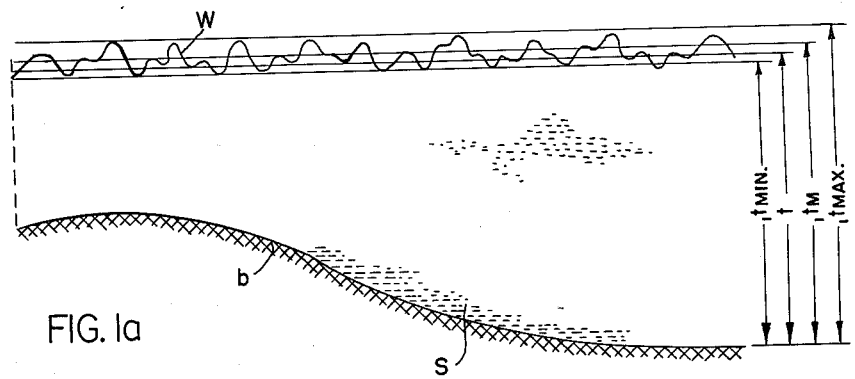

Jan. 16, 1962 H. KIETZ ETAL 3,017,606
ECHO SOUNDING SYSTEM
Filed Sept. 10, 1958 3 Sheets-Sheet 1

INVENTORS
HANS KIETZ
WILLY KUNZE
BY
Ezekiel Wolf, Wolf & Greenfield
ATTORNEYS

INVENTORS
HANS KIETZ
WILLY KUNZE
BY
Ezekiel Wolf Wolf + Greenfield
ATTORNEYS

Jan. 16, 1962     H. KIETZ ETAL     3,017,606
ECHO SOUNDING SYSTEM

Filed Sept. 10, 1958     3 Sheets-Sheet 3

INVENTORS
HANS KIETZ
WILLY KUNZE
BY
*Ezekiel Wolf, Wolf & Greenfield*
ATTORNEYS 3,017,606
ECHO SOUNDING SYSTEM
Hans Kietz, Pragerst. 23, and Willy Kunze, Alten Eichen 44, both of Bremen, Germany
Filed Sept. 10, 1958, Ser. No. 760,529
9 Claims. (Cl. 340—3)

This application is a continuation-in-part of application Serial No. 418,056 filed March 23, 1954 for Suppression of Disturbances Aboard Ship, now abondoned.

The present invention relates to a means and method of compensating for variations in depth indications in oceanic sounding equipment caused by vertical movements of the ship in which the equipment is installed on the ocean surface.

In echo sounding devices such as used for recording the depths of schools of fish above the sea bottom, an error is introduced into recordings of successive signals on a recording graph due to the intermittent and constant motion of the ocean surface. The recordings of the graph are displaced from their proper location a distance corresponding relatively to vertical movement of the ship. The present invention is designed to overcome this difficulty.

In the present invention two voltages are obtained by suitable circuitry. The first voltage corresponds with and is determined by the instantaneous and last measured vertical distance between the ship and sea bottom. The second voltage corresponds with and is determined by an average vertical distance between the ship and sea bottom as measured over a selected and preceding time period. The time period which includes the time of the last measurement of the distance between the ship and sea bed, is long in comparison with the time of measurement of the fluctuations caused by individual sea waves. These two derived voltages are used as a control quantity for displacing a recording chart from its normal position in relation to a stylus sweep in a direction substantially parallel to the movement of the stylus. Thus, movement of the recording chart is obtained which is substantially linear in relation to the fluctuations of measured distances between the ship and sea bottom which are caused by the vertical movement of the ship on the ocean surface.

In addition to eliminating incorrect fluctuations in the recorded contour of the sea bottom, caused by ocean waves, the present invention provides a means and method by which schools of fish above the sea bottom are more clearly contrasted with an accurately depicted curve representing the profile of the sea bottom.

As a modification of the present invention, in order to eliminate the effect of the rolling and pitching of the ship which causes a simulation of depth variation, the oscillators of the echo sounding equipment may be installed in a cardanic suspension, or alternately the depth indication can be compensated by a factor dependent upon the momentary angle of inclination of the ship relative to the vertical.

The derived control voltage may be used in several ways to effectively compensate for variations in the echo signal transmit-return time interval which are due to the vertical movement of the ship on the ocean surface. In one method which differs from that as indicated above, the transmittal time velocity is decreased on a recording time scale when the ship is lifted by the movement of the sea and conversely when the ship moves closer towards the sea bottom, the velocity is increased correspondingly. In this manner the echo graph recorder will indicate the average depth or the position of the ship as it would appear in a calm sea.

However the preferred means of utilizing the controlled voltage as indicated above does not contemplate the changing of the time scale. In this arrangement a zero point on a recording graph or a point corresponding essentially to the average sea level is moved in a linear relation to variations in the control voltage, which in turn vary linearly with respect to the variations in the depth due to the surface movement of the sea. Thus desired results may be obtained by reciprocating the recording chart paper parallel to a recording stylus movement as a function of the increase or decrease of the indicated depth.

There is an essential difference between these two methods in that a certain distortion of the true echo image will result when compensation is effected by changing the velocity of time deflection, as this adjusted velocity will only coincide with the scale of the echo graph when the ship is passing through a center position corresponding to a smooth sea. On the other hand when a compensation is effected by means of displacement of the zero point, the corresponding time scale will be maintained as these displacements from the zero point correspond to the true position of the ship. For this reason the distances of the zero point from the bottom are also recorded, by recording the emission of sound at the zero point. Thus, an undistorted curve of the sea bed uninfluenced by the movement of the sea surface, as well as a curve corresponding to the actual sea surface will be obtained. The change of the time scale moreover depends upon the actual depth, whereas displacement of the zero point will only depend upon variations in depth effected by the vertical movement of the ship on the sea.

In order to assure a proper recording of variations in depth which result from changes in the contour of the sea bottom including hollows, the measuring device is arranged and adjusted in such a manner as to measure the average value about which the depth indication is varied with the derived control voltage being adjusted linearly with respect to the difference between this average value and the instantaneous value which is a function of the instantaneous depth. As the variations in depth which result from surface movement of the sea occur in a rather limited rhythm, and further always vary about an average value which corresponds to a value substantially equal to that which would be obtained if the sea were calm, the variations in depth which are derived from the surface movement of the sea can easily be distinguished from the actual variations in the depth of the sea due to variations in the contour of the sea bottom.

Where the upper and lower limits of the variation in depth are first measured in order to determine the average depth of the water, it is also possible by measuring the differences between these two limiting values to determine and indicate in a suitable manner the mean sea depth in the form of a voltage value or alternately in a graphical manner.

Figure 1B:
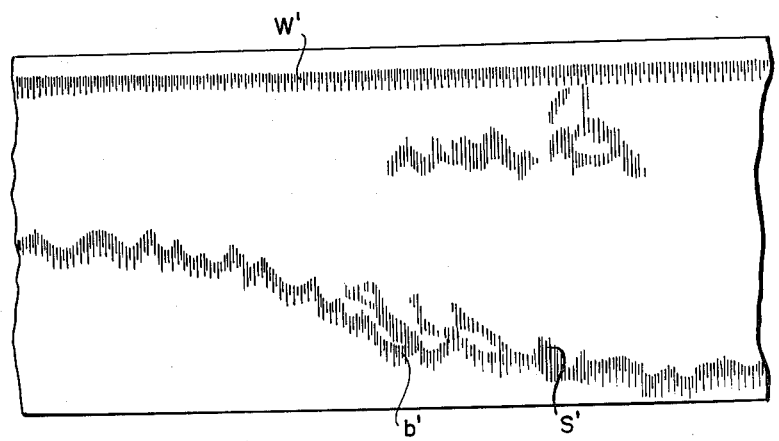
Figure 1C:
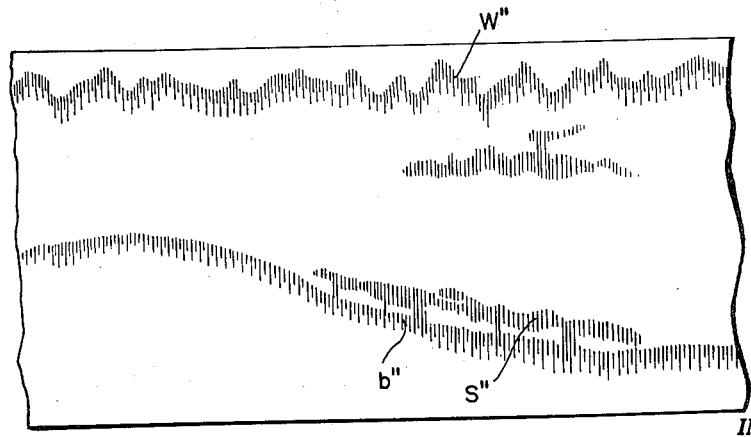
Figure 2:
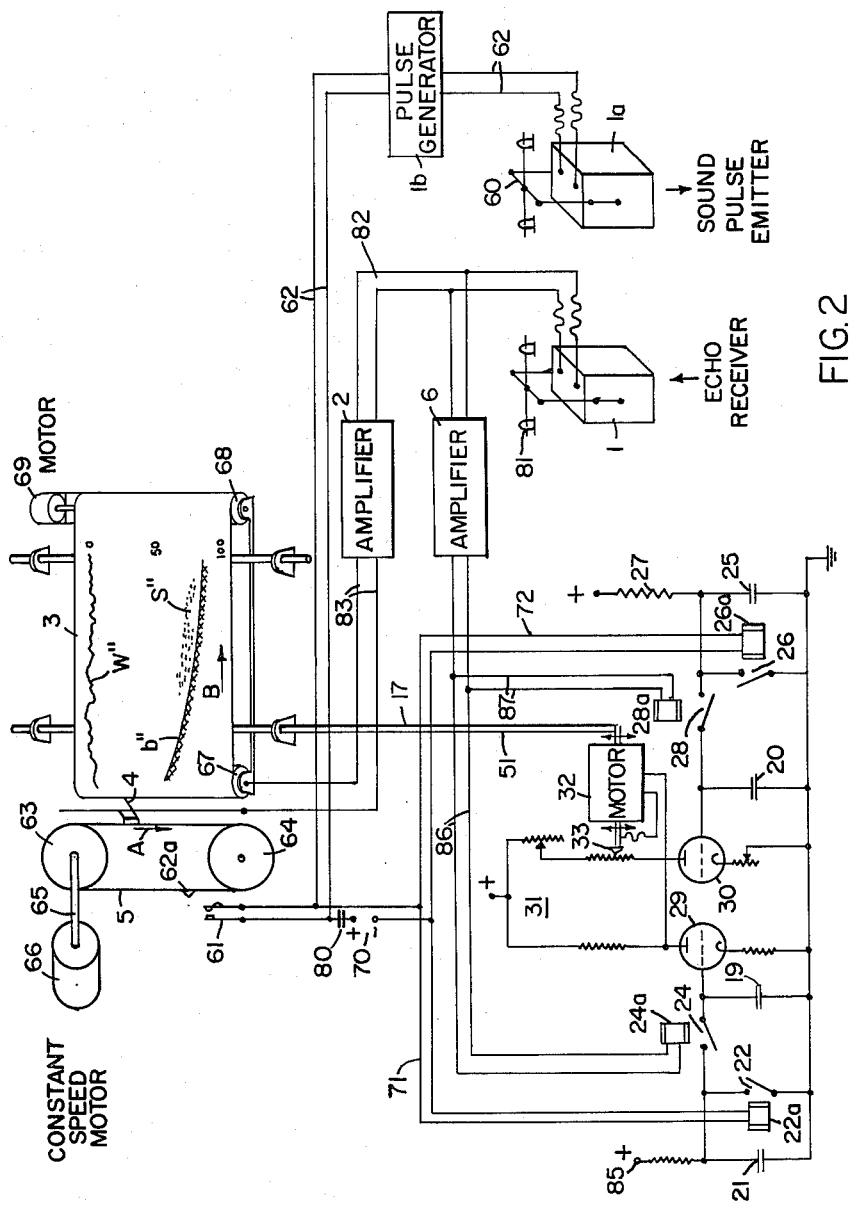
Figure 4:
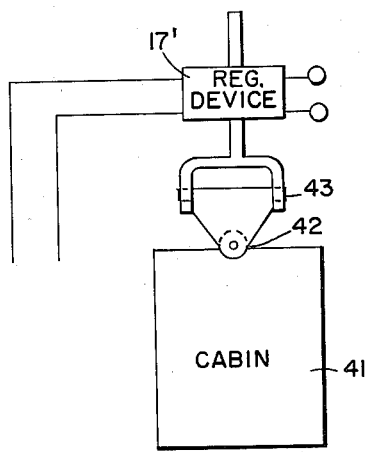
Figure 3:
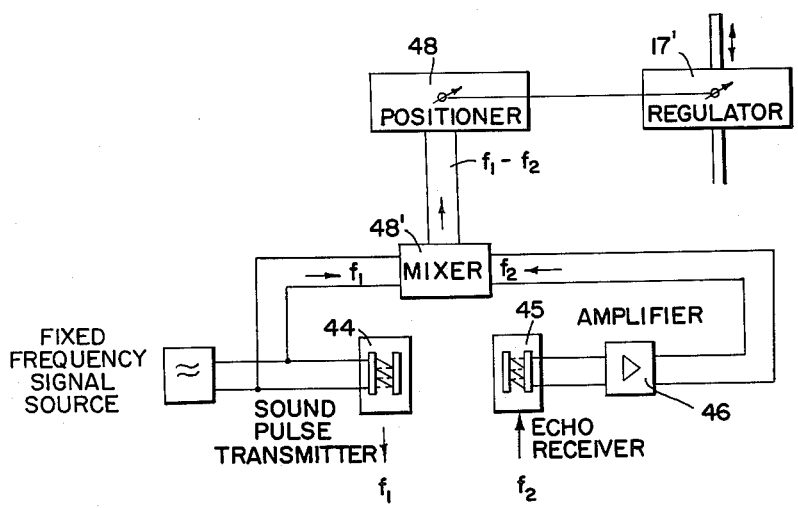

These and other objects and advantages of the present invention will be more clearly understood when considered in connection with the accompanying drawing in which:

FIGURE 1a is a graphic illustration of sea surface, sea bed and school of fish,

FIGURE 1b is an illustrative graphic recording of the area illustrated in FIGURE 1a as recorded by conventional echo sounding equipment, FIGURE 1c is an illustrative graphic recording of the echo soundings obtained with the present invention, FIGURE 2 is a schematic illustrative embodiment of the present invention, and FIGURES 3 and 4 are schematically illustrative modifications of the present invention.

Echo sounding equipment which has been used to date determines the time required for transmission of a sound pulse from the echo oscillator to the sea bed and back to the echo receiver. The transmission time is suitably indicated on graphic chart by a recording stylus which records the time of emission as a zero line and instant of reflection which is indicative of the sea bed location. When a heavy sea is running and the ship is rolling, the transmitting and receiving oscillator of an echo sounder in the ship is continuously moved in vertical directions relative to the sea bed and about an intermediate level corresponding with an average smooth surface of the sea. These movements effect variations in the transmission time and in the measured apparent depth. It is therefore obvious that distortions will result in recording the contour of the sea bed when measurements are made in rough seas unless compensations are made for these variations.

These conditions and the objects of the present invention may be graphically indicated with reference to FIGURES 1a, 1b and 1c. Assuming conditions as graphically indicated in FIGURE 1a with the ship and particularly the echo sounding equipment in it moving in a direction as indicated by the line W with a sea bed having a contour as indicated by the line b and a school of fish S above this sea bed, an echo image will be obtained such as shown in FIGURE 1b from conventional type of echo sounding equipment. In FIGURE 1b, the lines W' represent the emitted sound pulses at the instant of emission as recorded along the zero line. This line corresponds to the line W indicated in FIGURE 1a which in turn is an indication of the surface of the water. It is of course clear that the line W' does not accurately depict the line W. The variations which are caused by the surface movement of the sea as indicated by the line W, while not properly reflected in the line W', are in fact superimposed and perceptible in the echo image of the sea bottom. These distortions are indicated in the sea bed b'. Moreover, the echoes S' of the school of fish S contains superimposed components effected by the movement of the sea surface. It will be noted, particularly in the case of schools of fish close to the bottom that contrast of the school of fish S is lost due to the superimposed distortion.

In the present invention the zero line is not represented as a straight line but by a line which moves vertically in linear relation to actual displacements of the echo sounding equipment at the time of emission of successive sound pulses. Thus a zero line W'' as indicated in FIGURE 1c is recorded from the emission of the sound pulse, with this line W'' indicating and corresponding to the actual motion of the ship indicated by the line W of FIGURE 1a. The variations of the line W are not recorded in line b'' which indicates the actual profile of the sea bed without distortion. Moreover the echo image S'' of the school of fish S is reproduced on the graph in clear contrast to the contour of the sea bottom b''.

The preferred form of the invention is illustrated in FIGURE 2. In this arrangement a sound pulse emitter 1a is connected to a pulse generator 1b which in turn is connected to keying contacts 61 through the line 62. The keying contacts 61 are periodically closed by the member 62a mounted on the endless belt 5 which also carries the recording stylus 4. The belt 5 extends around the rollers 63 and 64. The roller 63 acts as a drive roller and is in turn connected through a shaft 65 to the operating constant speed motor 66. This arrangement is substantially conventional and is disclosed in French Patent No. 928,919. The stylus 4 is adapted to traverse continuous chart paper 3 in the direction indicated by arrow A. The chart paper 3 which is an electro-sensitive paper coated with graphite or the like will be blackened when a current flows through the stylus 4. The paper 3 is mounted on rollers 67 and 68 and moves in the direction of arrow B preferably at a uniform rate. This movement may be effected by suitably controlled means such as the motor 69. The cyclical movement of the member 62a periodically closes the contacts 61 which in turn cause emission of a sound pulse from emitter 1a, the power being derived from the power source 70 through a blocking capacitor 80 and lines 62. Relay coils 22a and 26a are connected through the lines 71 and 72 respectively to the power source 70 so that upon closing of the keying contact 61, the relays 22 and 26 will also momentarily close, thus short circuiting condensers 21 and 25. Simultaneous with this operation a current passing from the power source 70 through the contact member 62 will be emitted from the stylus 4 recording on the electro-sensitive paper 3 a segment of the zero lines W''. It will be noted that the speed of rotation of the belt 5 is such as to assure continuity to the successive recorded pulses so as to properly form the line W''. This of course will permit the proper recording of all echoes within the depth range in interest. The time required to return the marking stylus to substantially the zero position is twice the measuring range thus assuring that double and triple echoes of the sea bed will not be recorded. In this connection it will be noted that b'' and S'' on chart paper 3 represent respectively the echo recording from the sea bed b and from the school of fish S. The reflected echo signal is received in the echo receiver 1, which may if desired be suspended in a cardanic suspension 81, similar to suspension 60. The received echoes in the receiver 1 transmitted along the lines 82, to the amplifier 2 in turn connected electrically to the stylus 4 through the lines 83. Thus these signals which are received by reflection are continuously recorded upon the moving chart paper 3.

In order to compensate for variations in the time of transmission measurements which are due to the vertical motion of the ship on the sea surface, a portion of this return pulse signal is tapped from the lines 82 and fed to the amplifier 6. Relays 24a and 28a are connected in parallel through the lines 86 and 87 to this amplifier 6, with these relays adapted to close relay contacts 24 and 28 respectively, when energized from received signals in the receiver 1. These contacts 24 and 28 form a portion of the circuit in which a first condenser 19 and a second condenser 20 are designed to be charged to voltages which correspond respectively to the momentary depth T and the average depth $T_m$. Condenser 19 is connected through the switch 24 across the condenser 21 with condenser 19 being small in comparison with condenser 21. Condenser 21 which is discharged at the moment of sound pulse emission by the short circuiting action of switch 22 as described above charges from the instant of this sound emission from voltage derived from the power source 85 through the resistor 23. During the interval after the sound emission, relay 22a is deenergized and consequently contact 22 is open. At the moment of the arrival of the ground echo, relay 24a is energized closing contact 24. This briefly connects condenser 19 across the terminals of the larger condenser 21. Similarly condenser 20 is simultaneously connected through the contact 28 across the terminals of condenser 25 which is small in comparison to condenser 20. Condenser 25 which is discharged at the instant of sound emission through the closing of the short circuiting contact 26 will charge during the interim period from the time of sound emission to the arrival of the ground reflection signal at which instance the relay 28a will be energized closing the contact 28. This will briefly connect the condenser 20 across the terminals of charged condenser 25 which has been charged from the power source through the resistor 27. Condenser 20 it will be noted is several times larger than condenser 25. In this arrangement the voltage of the large condenser 20 follows slowly voltage fluctuations of the small condenser 25 over a number of arriving echo signals, thus assuring that the voltage across condenser 20 corresponds to an average value of the condenser 25 voltages which in turn is a measure of the average depth $T_m$. On the other hand condenser 19 which is small in comparison with condenser 21 rapidly follows the voltage fluctuations of condenser 21 thus providing a measure T which is indicative of the momentary depth of the sea.

Condensers 19 and 20 are connected respectively to the grids of tubes 29 and 30 and thereby act as control voltages. These tubes form branches of a resistor bridge 31. In the zero branch of this bridge there is a motor 32 which in case the equilibrium of the bridge is disturbed, automatically restores the equilibrium of the bridge as a result of the voltage differences in condensers 19 and 20, with this equilibrium being restored by the displacement of the bridge tap 33. The motor is also operatively connected to the shaft 17 and moves it longitudinally with respect to the length of the shaft 17 distances relative to the differences in voltage appearing across the condensers 19 and 20 at the instant of arrival of a reflected signal. This shaft 17 is connected to the chart paper and moves it longitudinally with respect to the movement of the stylus. Thus whenever an echo signal arrives which is delayed or advanced due to momentary variation in the sea depth, these momentary variations will be determined and the chart paper will be accordingly adjusted so that the next recorded portion of the line W'' will be displaced accordingly, thereby assuring that over a period of successive signal cycles, the variation will be effectively removed from the recording of the sea bottom and will properly be indicated in the recording of the sea surface by the line W''. In this connection it may be noted that amplifier 6 does not amplify as much as amplifier 2 so that response from the weak fish signals will not be reflected in the circuitry.

A modification of the invention is shown in FIGURE 3. In this arrangement, the sound pulse transmitter 44 having a frequency $f_1$ in which the pulses are directed to the sea bottom and a receiver 45 adapted to receive a frequency $f_2$ which differs from the frequency $f_1$, according to the vertical movement of the ship relative to the sea bottom are suitably mounted in a vessel. The impulse which is received at a frequency $f_2$ is conducted from the receiver 45 to an amplifier 46 to a mixer 48' in which the difference frequency $f_1-f_2$ output signal is used as a control signal actuating positioner 48 for positioning the regulator 17' of the type previously described.

In FIGURE 4 there is illustrated a further modification in which there is illustrated a modification of means for cardanic suspension. In this arrangement 41 is a cabin or casing with a cardanic suspension 42, 43, which is controlled in its up and down movement by a regulating device 17' as disclosed in FIGURE 2 for the displacement of the cabin or casing 41 in a vertical direction opposite to the vertical movement of the ship in the sea way. Regulating device 17' may be made like or correspond to the device shown in FIGURE 2 for the displacement of the recording paper in a vertical direction.

Having now described our invention we claim:

1. An apparatus for recording a true contour of an area of the sea bottom over which the apparatus moves for use in a depth sounding equipped vessel comprising means for transmitting a sounding pulse, a sounding receiver for receiving the reflected echo of said pulse, recording means actuated at the instant of transmission of said pulse and at the instant of reception of the echo thereof for graphically representing in spaced relation the position of said vessel relative to the sea bottom, means responsive to said received echo signals for deriving a control signal which is a function of the difference between the instantaneous vertical position of said vessel and the average vertical position as determined over a time interval long in comparison with the period of the wave motion of the sea, means for adjusting the relative locations of successive representations of the instants of transmission in response to said control signal whereby successive representations of the instants of reception may be recorded in a manner unaffected by said wave motion.

2. An apparatus for recording a true contour of an area of the sea bottom over which the apparatus moves for use in a depth sounding equipped vessel comprising means for transmitting a series of successive sounding pulses, a sounding receiver for receiving reflected echoes of said pulses, means for recording successively signals representative of the true intervals between the transmission of each successive pulse and receipt of the reflected echo from each transmitted pulse, means responsive to said received echoes for deriving a control signal which is a function of the difference between the instantaneous vertical position on the sea surface of the vessel and an average vertical position as determined over a time interval long with respect to the period of the sea wave motion, and means for adjusting said recording means in response to said control signal whereby the recording of the instant of transmission will be displaced relative to said control signal and the recording of the instant of receipt of said reflected echoes will depict a true contour of the sea bottom being measured.

3. A device as set forth in claim 2 wherein, said means for deriving a control signal comprises means establishing a voltage varying relative to changes in the instantaneous measured depth, means establishing a voltage varying relative to changes in an average depth measured over a period of time long with respect to the period of sea wave motion, and means for deriving a signal representative of the voltage difference between said last two mentioned voltages.

4. A device as set forth in claim 2 wherein, said means for deriving a control signal includes two pairs of condensers with one of each pair being relatively large and the other of each pair being relatively small, synchronously operated means for connecting the large condenser of one pair and the small condenser of the other pair to a power source at the instant of pulse emission, means for connecting each of said last mentioned condensers to the other condensers of their respective pairs, and means for measuring the difference in voltages between said last mentioned condensers.

5. A device as set forth in claim 2 wherein said means for transmitting pulses and said receiver comprise a pair of transducers and cardanic suspension means supporting said transducers.

6. A device as set forth in claim 2 wherein said means for adjusting said recording means comprises shaft means adapted for longitudinal movement in linear response to said control signal, and means operatively interengaging said shaft means and supporting a portion of said recording means for displacing a portion of said recording means linearly in response to said control signal.

7. An apparatus for providing a true contour of the sea bottom in depth sounding utilizing the time of travel of a sound pulse to the bottom and return to a sound receiver with reference to an average vertical position of a vessel on the sea surface from which the sounding is made comprising, means for transmitting a sounding pulse, a sound receiver for receiving the reflected echo thereof, means for graphically recording a representation of the time interval between the transmission and receipt of the echo reflected therefrom, and means for displacing the graphic recording of the initial instant of transmission of successive pulses comprising, parallelly connected condenser and rectifier circuits, means for establishing a maximum potential and a minimum potential on said parallelly connected condenser and rectifier circuits corresponding to maximum and minimum depths, means for deriving a signal representative of the average value between said maximum and minimum potentials, means for providing a signal characteristic of the difference between the maximum potential and said average value, and means responsive to the latter signal for displacing the graphic representation of the initial instant of transmission.

8. An apparatus for providing a true contour of the sea bottom in depth sounding utilizing the time of travel of a sound pulse to the bottom and return to a sound receiver with reference to an average vertical position of a vessel on the sea surface from which the sounding is made comprising means for transmitting a sounding pulse, a sound receiver for receiving the reflected echo thereof, means for graphically recording the time interval between the transmission of a sounding pulse and receipt of the echo reflected therefrom, and means for displacing the graphic recording indicating the initial instance of transmission of successive pulses, said displacing means comprising means for establishing on a first condenser momentarily, a potential coreponding to the depth, means for establishing on a second condenser a potential corresponding to the average of a number of successive soundings of depths, a bridge circuit for providing a control signal representative of the difference between said potentials, and means responsive to said control signal for actuating said displacing means.

9. An echo sounding device for recording the distance between the sea bottom and objects above it by measuring the transmitting and reflection time of periodically emitted sound pulses and compensating the measured distances in recording them for fluctuations caused by motions of the ship in the waves of the sea, comprising means for periodically emitting successive sound pulses, means for receiving echoes resulting therefrom, means for recording the received echoes in relation to the time of reflection, each received echo recording being made with reference to a zero point the position of which in relation to an average of successive zero point positions is adjustable, amplitude selective means for separating the received bottom echoes from fainter echoes, means other than said recording means for providing an indication of the time interval between the emission of a sound pulse and the return of its echo from the bottom, means for providing a signal representative of the average value of consecutive ones of said time intervals over a period of time long in comparison with the period of the wave motion of the sea, means for providing a control signal characteristic of the difference between the last of said time intervals corresponding to the return of the echo from the bottom and said average value, and means operatively connected to said recording means for continually adjusting the zero point to which each received echo recording is referred according to the existing value of said difference, whereby the contour of the sea bottom and the position of objects above it are recorded in near conformity to their true depths and relatively free from fluctuations due to the ship's motions in the sea.

References Cited in the file of this patent

UNITED STATES PATENTS

| | | |
|---|---|---|
| 2,774,954 | Yosano | Dec. 18, 1956 |
| 2,826,749 | Ellenberger | Mar. 11, 1958 |